(12) United States Patent
Wu

(10) Patent No.: US 10,948,755 B2
(45) Date of Patent: Mar. 16, 2021

(54) CURVED DISPLAY PANEL AND CURVED DISPLAY DEVICE

(71) Applicants: HKC CORPORATION LIMITED, Guangdong (CN); CHONGQING HKC OPTOELECTRONICS TECHNOLOGY CO., LTD., Chongqing (CN)

(72) Inventor: Chuan Wu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 19 days.

(21) Appl. No.: 16/312,719

(22) PCT Filed: Nov. 13, 2018

(86) PCT No.: PCT/CN2018/115234
§ 371 (c)(1),
(2) Date: Dec. 21, 2018

(87) PCT Pub. No.: WO2020/073416
PCT Pub. Date: Apr. 16, 2020

(65) Prior Publication Data
US 2020/0117039 A1    Apr. 16, 2020

(30) Foreign Application Priority Data

Oct. 11, 2018  (CN) .......................... 201811184790.8

(51) Int. Cl.
*G02F 1/1333* (2006.01)
*G02F 1/1362* (2006.01)
(Continued)

(52) U.S. Cl.
CPC ...... *G02F 1/133305* (2013.01); *G02F 1/1339* (2013.01); *G02F 1/136209* (2013.01);
(Continued)

(58) Field of Classification Search
CPC ......... G02F 1/133305; G02F 1/136286; G02F 1/1339; G02F 1/136209;
(Continued)

(56) References Cited

U.S. PATENT DOCUMENTS

2016/0041443 A1* 2/2016 Wu .................. G02F 1/133512
349/43
2016/0116774 A1* 4/2016 Ma .................. G02F 1/133514
156/250
(Continued)

Primary Examiner — Shan Liu

(57) ABSTRACT

A curved display panel and a curved display device are disclosed. The curved display panel includes a first substrate, a second substrate disposed opposite to the first substrate, and a plurality of spacers disposed between the first substrate and the second substrate. The plurality of spacers is configured to define a space between the first substrate and the second substrate. The first substrate includes a display area, a frame area, and an array arrangement disposed in the display area. The array arrangement includes a plurality of active switches and a plurality of pixel cells. In a planar state, each spacer is away from a corresponding active switch by a deviation distance; and in a curved state, a position of each spacer overlaps that of the corresponding active switch.

14 Claims, 10 Drawing Sheets

(51) Int. Cl.
*G02F 1/1339* (2006.01)
*G09F 9/30* (2006.01)

(52) U.S. Cl.
CPC ............. *G02F 1/136286* (2013.01); *G02F 2001/136222* (2013.01); *G09F 9/301* (2013.01)

(58) Field of Classification Search
CPC ....... G02F 2001/136222; G02F 1/0107; G02F 1/13392; G02F 1/13394; G02F 1/161; G02F 1/133377; G02F 1/133707; G02F 2001/13396; G02F 2001/13398; G02F 1/1333; G02F 1/136277; G02F 2001/133302; G02F 2001/133368; G02F 2001/133354; G02F 2201/56; G09F 9/301; H01L 27/3246; H01L 27/12; H01L 27/1203; H01L 27/1218; H01L 21/02367
USPC .................................................. 349/155–158
See application file for complete search history.

(56) References Cited

U.S. PATENT DOCUMENTS

| | | | |
|---|---|---|---|
| 2016/0370633 A1* | 12/2016 | Byeon | G02F 1/13394 |
| 2018/0136503 A1* | 5/2018 | Liu | G02F 1/13394 |
| 2019/0025623 A1* | 1/2019 | Hirata | G02F 1/13394 |
| 2019/0064572 A1* | 2/2019 | Park | G02F 1/133305 |
| 2020/0050063 A1* | 2/2020 | Yoshida | G02F 1/134363 |

* cited by examiner

CURVED DISPLAY PANEL AND CURVED DISPLAY DEVICE

CROSS-REFERENCE TO RELATED APPLICATIONS

This application is the US national stage application of PCT International Application No. PCT/CN2018/115234, which was filed Nov. 13, 2018 and claimed priority to Chinese Patent Application No. 201811184790.8, filed on Oct. 11, 2018. The content of Chinese Patent Application No. 201811184790.8 is incorporated herein by reference.

BACKGROUND

Technical Field

This application relates to the field of display technologies, and more particularly to a curved display panel and a curved display device.

Related Art

A design that an entire screen of a curved display device is arc-shaped matches the structure of arc-shaped human eyes, more satisfies design of human eyes in terms of human engineering, and can achieve and effect of a wide panorama image and provide same visual enjoyment both in the middle and at edges of the screen. In addition, when viewed at a near distance, the screen further reduces distortion of off-axis viewing, and can provide more comfortable feelings for human eyes as well as immersed viewing experience.

A curved display panel is a core component of the curved display device. A manufacture process of the curved display panel is: first manufacturing a display panel in a planar state, and bending the display panel in the planar state through physical bending or in other related or similar force applying manners, to form the curved display panel.

When the curved display panel is in the planar state, a position of spacers on an opposite substrate approximately corresponds to a position of active switches in a display area of an array substrate. However, when the liquid crystal panel is bent to be in a curved state, due to a radian of the curved liquid crystal panel and stress on a glass base, the opposite substrate and the array substrate relatively slide after being bent, and therefore, the two opposite substrates of the display panel are misaligned, resulting in visual darkness, and lowering optical taste.

SUMMARY

An objective of this application is to provide a curved display panel, to resolve problems, including but not limited to, that after a display panel in a planar state is bent to form a curved display panel, thicknesses of a space between two substrates of the curved display panel are not equal, causing poor display quality of the curved display panel.

A technical solution used in an embodiment of this application is to provide a curved display panel, including a first substrate, including a display area, a frame area arranged surrounding and peripheral of the display area, and an array arrangement disposed in the display area, where the array arrangement includes a plurality of active switches and a plurality of pixel cells, the plurality of pixel cells is respectively coupled to the plurality of active switches, and the plurality of active switches is electrically coupled to junctions of a plurality of data lines and a plurality of scanning lines; a second substrate, disposed opposite to the first substrate; and a plurality of spacers, disposed on the second substrate and configured to define a space between the first substrate and the second substrate. In a planar state, an arrangement sequence of a current column of spacers in the plurality of spacers is the same as that of a current column of active switches in the plurality of active switches in an arrangement direction of the plurality of data lines in the display area, and when a position of the current column of spaces overlaps that of the current column of active switches, a first spacing between neighboring columns of spacers differs from a second spacing between neighboring columns of switches by a deviation distance; and in a curved state, a position of the plurality of spacers overlaps that of the plurality of active switches.

Another objective of this application is to provide a curved display device, including: a controller; a first substrate, including a display area, a frame area arranged surrounding and peripheral of the display area, and an array arrangement disposed in the display area, where the array arrangement includes a plurality of active switches and a plurality of pixel cells, the plurality of pixel cells is respectively coupled to the plurality of active switches, and the plurality of active switches is electrically coupled to junctions of a plurality of data lines and a plurality of scanning lines; a second substrate, disposed opposite to the first substrate; and a plurality of spacers, disposed on the second substrate and configured to define a space between the first substrate and the second substrate. In a planar state, an arrangement sequence of a current column of spacers in the plurality of spacers is the same as that of a current column of active switches in the plurality of active switches in an arrangement direction of the plurality of data lines in the display area, and when a position of the current column of spaces overlaps that of the current column of active switches, a first spacing between neighboring columns of spacers differs from a second spacing between neighboring columns of switches by a deviation distance; and in a curved state, a position of the plurality of spacers overlaps that of the plurality of active switches.

In the embodiments of this application, the deviation of the spacers is designed in advance on the premise of not greatly changing an existing production procedure, to avoid misalignment between the spacers and the active switches in the curved state, enable the space between the two substrates to maintain an equal thickness, reduce luminance difference between areas on left and right sides and an area in the middle of the curved display panel, and reduce visual darkness, thereby improving display quality and optical taste of the curved display panel.

BRIEF DESCRIPTION OF THE DRAWINGS

To describe the technical solutions in the embodiments of this application more clearly, the following briefly introduces the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DETAILED DESCRIPTION

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

It should be noted that when an element is referred to as being "fixed" to or "disposed" on another element, it can be directly fixed to or disposed on the other element or intervening elements may also be present. When an element is referred to as being "coupled" or "connected" to another element, it can be directly or indirectly coupled or connected to the other element. Orientation or position relationships indicated by the terms such as "on", "below", "left", and "right" are based on orientation or position relationships shown in the accompanying drawings, and are used only for ease of illustration description, rather than indicating or implying that the mentioned apparatus or component must have a particular orientation or must be constructed and operated in a particular orientation. Therefore, such terms should not be construed as limiting of this application. Persons of ordinary skill in the art can understand the specific meaning of these terms according to specific situations. Unless otherwise particularly defined, "a plurality of" means two or more than two.

The technical solutions of this application are described in detail below with reference to the accompanying drawings and embodiments.

Figure 1A:
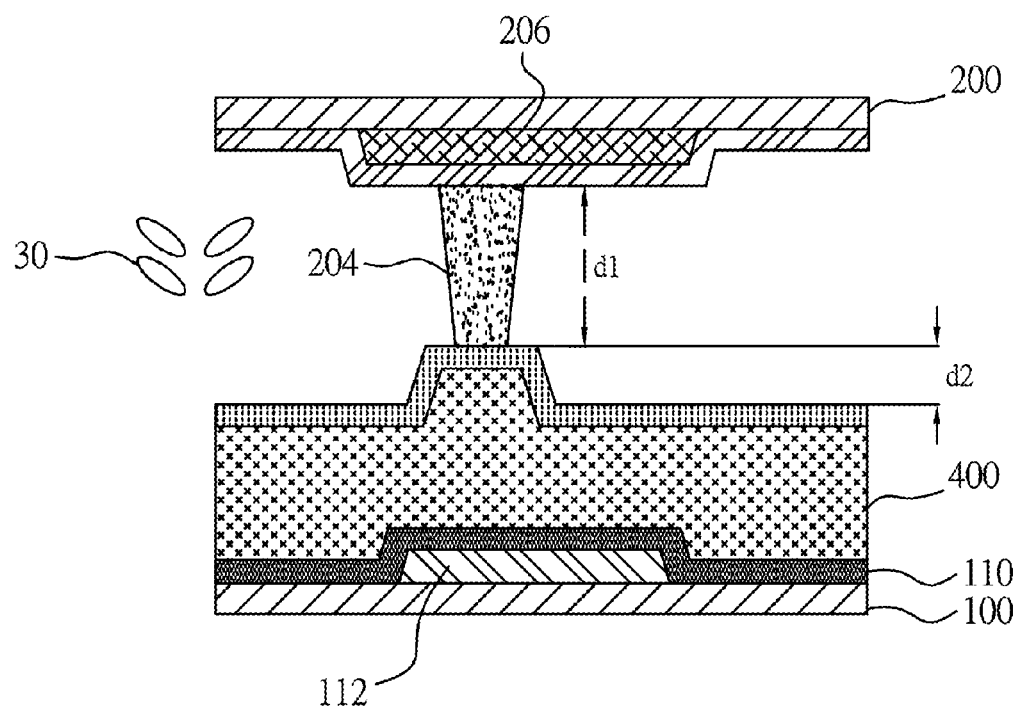
FIG. 1a is a cross sectional schematic view of an example of a curved display panel in a planar state.

FIG. 1a is a cross sectional schematic view of an example of a curved display panel in a planar state. A basic structure of the curved display panel includes a first substrate 100, a second substrate 200, and a liquid crystal layer 30. The first substrate 100 includes a display area, and a frame area arranged surrounding and peripheral of the display area. An array arrangement 110 is disposed in the display area, and the array arrangement 110 includes a plurality of active switches 112 and a plurality of pixel cells. The plurality of pixel cells is respectively coupled to the plurality of active switches 112, and the plurality of active switches 112 is electrically coupled to junctions of a plurality of data lines and a plurality of scanning lines. The second substrate 200 is disposed opposite to the first substrate 100, and the second substrate 200 includes a plurality of pixel areas corresponding to the pixel cells of the first substrate 100. A plurality of spacers 204 is disposed between the first substrate 100 and the second substrate 200 and configured to define a space between the first substrate 100 and the second substrate 200. The liquid crystal layer 30 is disposed in the space.

In an embodiment, the curved display panel further includes a color filter layer 400, and the color filter layer 400 may be disposed on the first substrate 100 or the second substrate 200.

A manufacture process of the curved display panel is: first manufacturing a display panel in a planar state, and bending the display panel in the planar state through physical bending or in other related or similar force applying manners, to form the curved display panel.

Figure 1B:
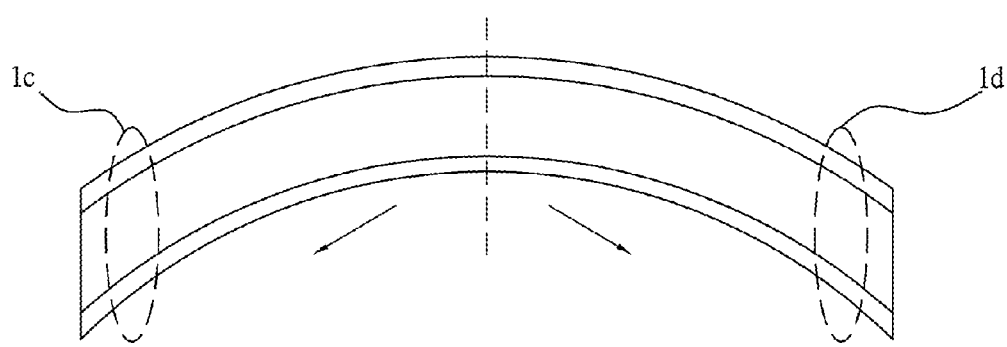
FIG. 1b is a schematic diagram of an example of a curved display panel bent towards a side of a second substrate.
Figure 1C:
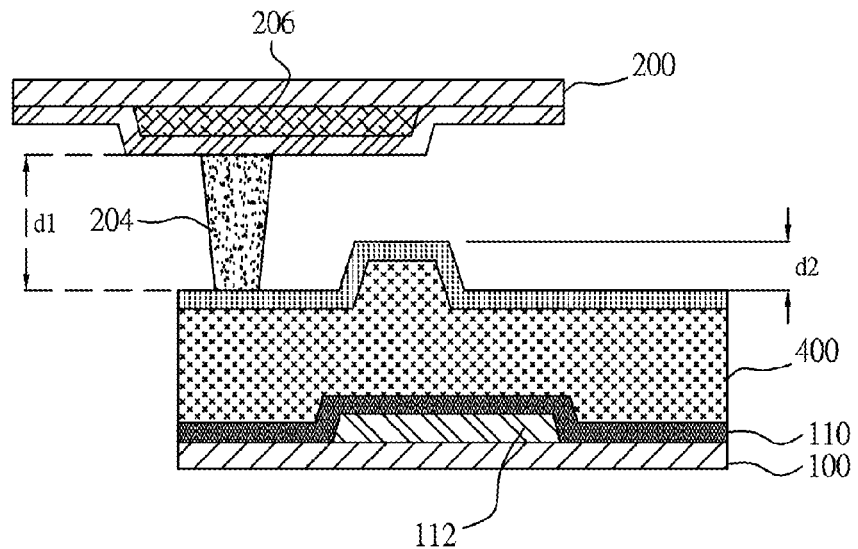
FIG. 1c and FIG. 1d are schematic diagrams of examples of a spacer deviating outward.
Figure 1D:
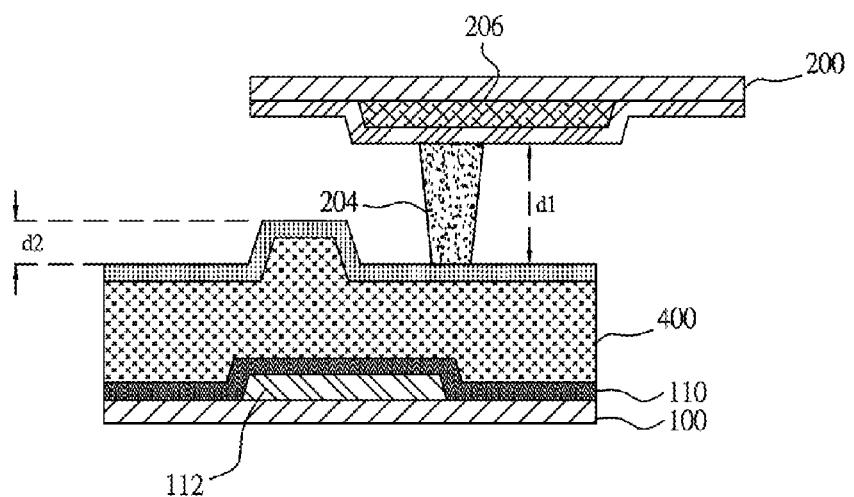
Figure 1E:
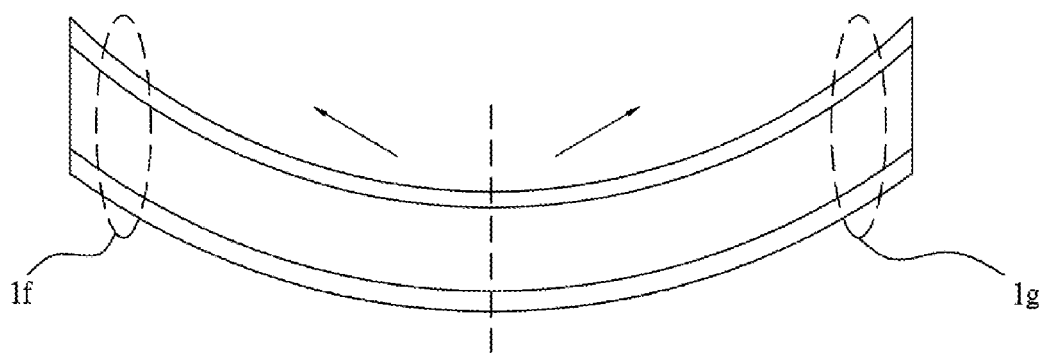
FIG. 1e is a schematic diagram of an example of a curved display panel bent towards a side of a first substrate.
Figure 1F:
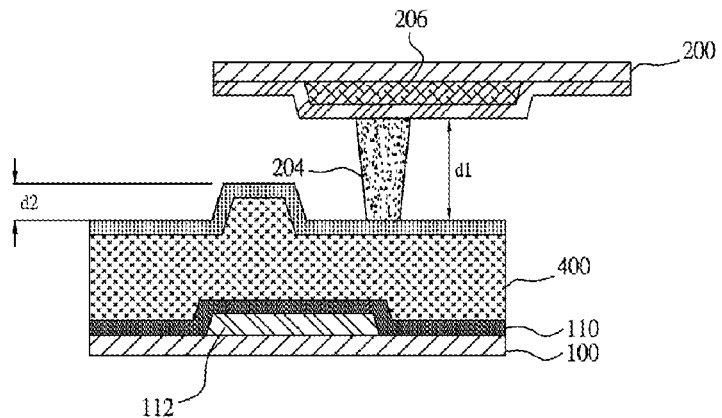
FIG. 1f and FIG. 1g are schematic diagrams of examples of a spacer deviating outward.
Figure 1G:
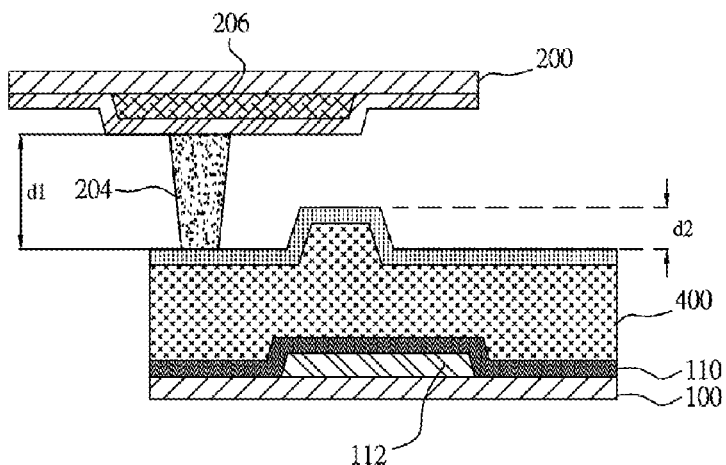

FIG. 1b is a schematic diagram of an example of a curved display panel bent towards a side of a second substrate. FIG. 1c and FIG. 1d are schematic diagrams of examples of a spacer deviating outward. FIG. 1e is a schematic diagram of an example of a curved display panel bent towards a side of a first substrate. FIG. 1f and FIG. 1g are schematic diagrams of examples of a spacer deviating outward. When the curved display panel is in the planar state, a position of the spacers 204 on the second substrate 200 approximately corresponds to a position of the active switches 112 in the display area of the first substrate 100. However, when the liquid crystal panel is bent to be in a curved state, due to a radian of the curved liquid crystal panel and stress on a glass base, the second substrate 200 and the first substrate 100 relatively slide after being bent, and therefore, the two opposite substrates of the display panel are misaligned. As shown in FIG. 1c and FIG. 1d, using a center of the second substrate 200 as a base point, a left side of the second substrate 200 deviates leftward relative to the first substrate 100, and a right side of the second substrate 200 deviates rightward relative to the first substrate 100. Alternatively, as shown in FIG. 1f and FIG. 1g, using a center of the second substrate 200 as a base point, a left side of the second substrate 200 deviates rightward relative to the first substrate 100, and a right side of the second substrate 200 deviates leftward relative to the first substrate 100. In both FIG. 1b and FIG. 1c, the position of the spacers 204 no longer corresponds to the position of the active switches 112, and is misaligned relative to a radial direction of the curved display panel.

In this way, thicknesses of panel package boxes in areas having a relatively large deviation on the left and the right sides of the curved display panel are not equal to a thickness of a panel package box in an area having a relatively small deviation (or having no deviation) in the middle of the curved display panel. The box thickness in the middle is d1+d2, and the box thicknesses on the two sides are d1−d2. Consequently, the space between the two substrates no longer maintains an equal thickness, causing luminance difference between the areas on the left and the right sides and the area in the middle of the curved display panel, resulting in visual darkness, and lowering optical taste.

Figure 2A:
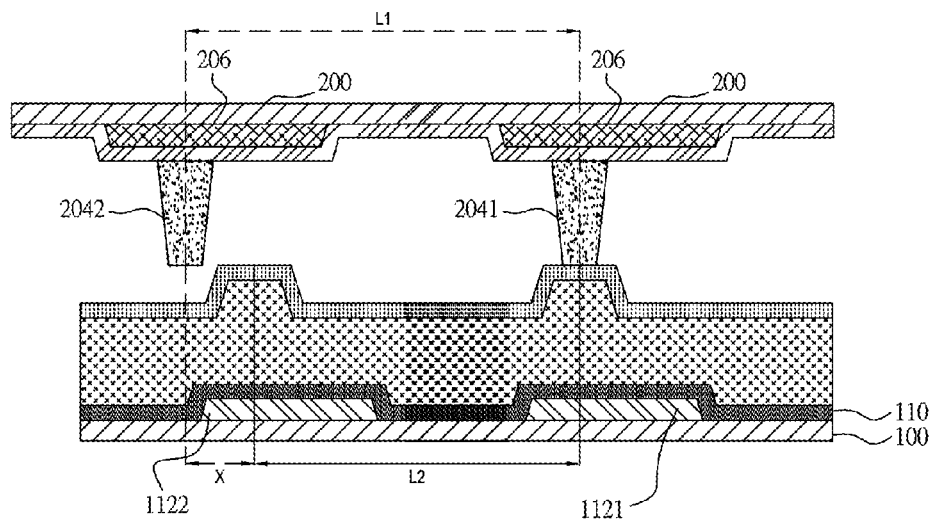
FIG. 2a is a schematic diagram of a deviation distance of a curved display panel according to an embodiment of this application.
Figure 2B:
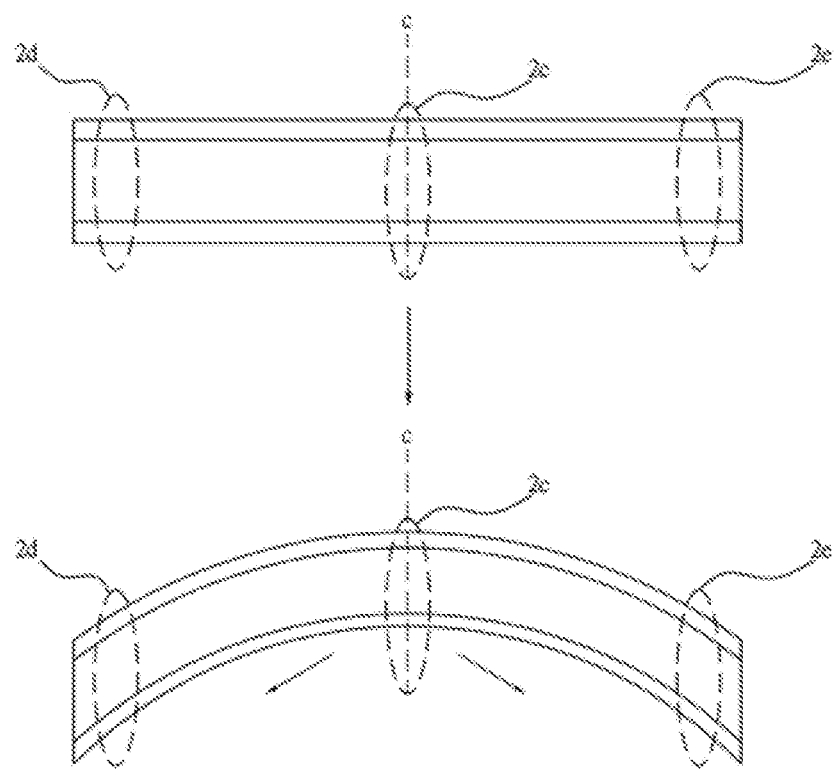
FIG. 2b is a schematic diagram of a bending change of a curved display panel according to an embodiment of this application.
Figure 2C:
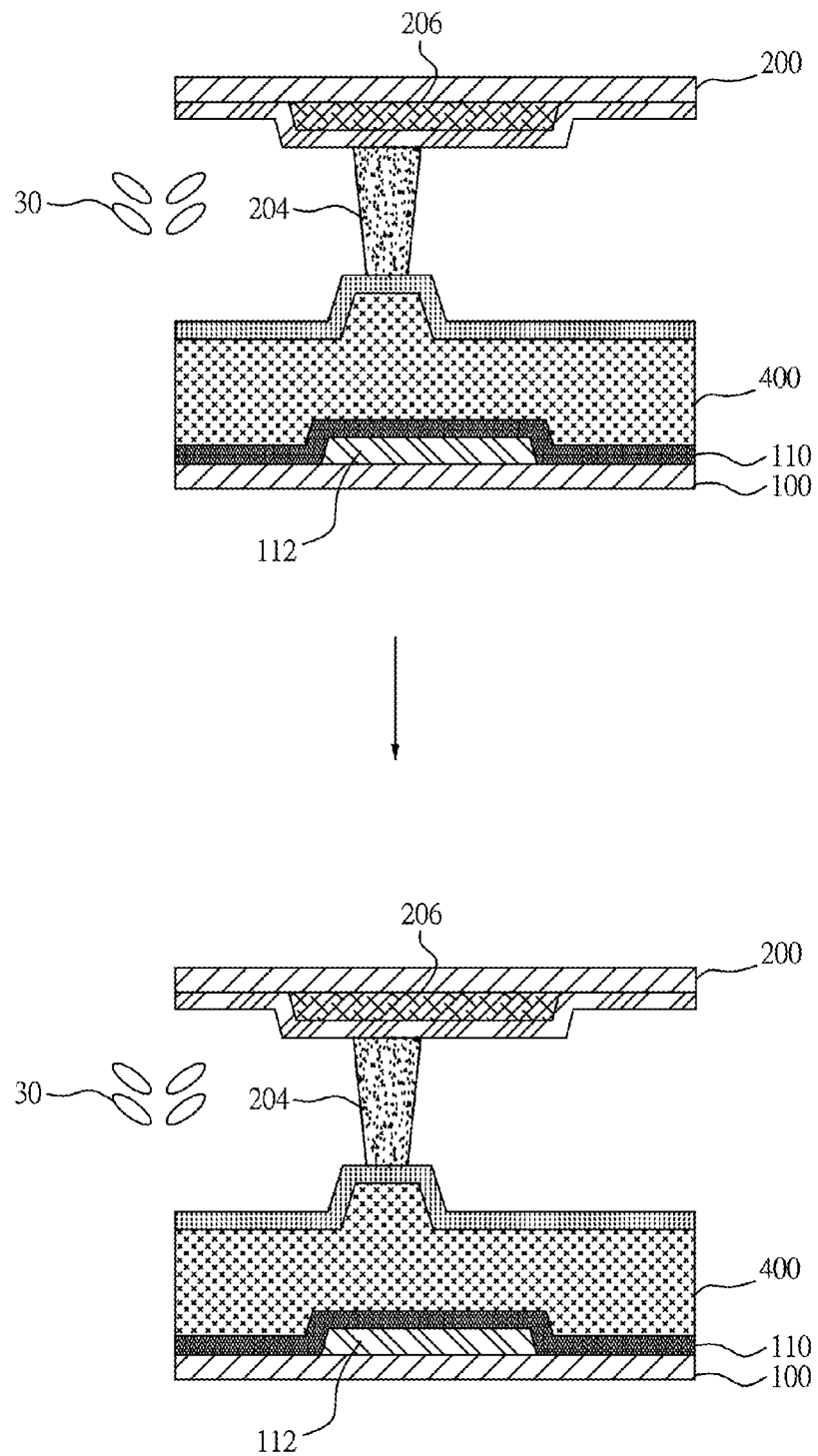
FIG. 2c is a schematic diagram of a status change in a middle part of the curved display panel in FIG. 2b.
Figure 2D:
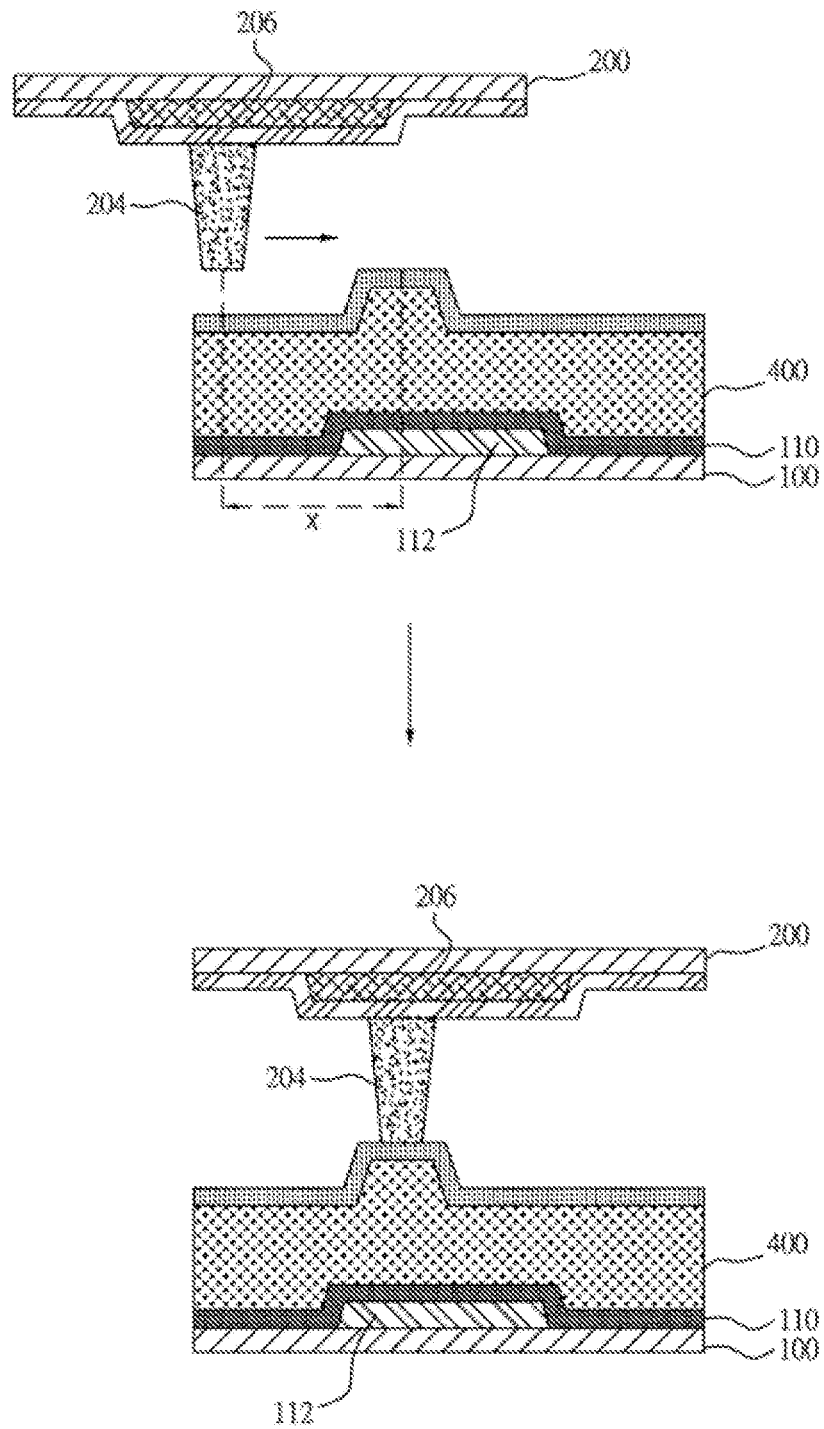
FIG. 2d is a schematic diagram of a status change in a left part of the curved display panel in FIG. 2b.
Figure 2E:
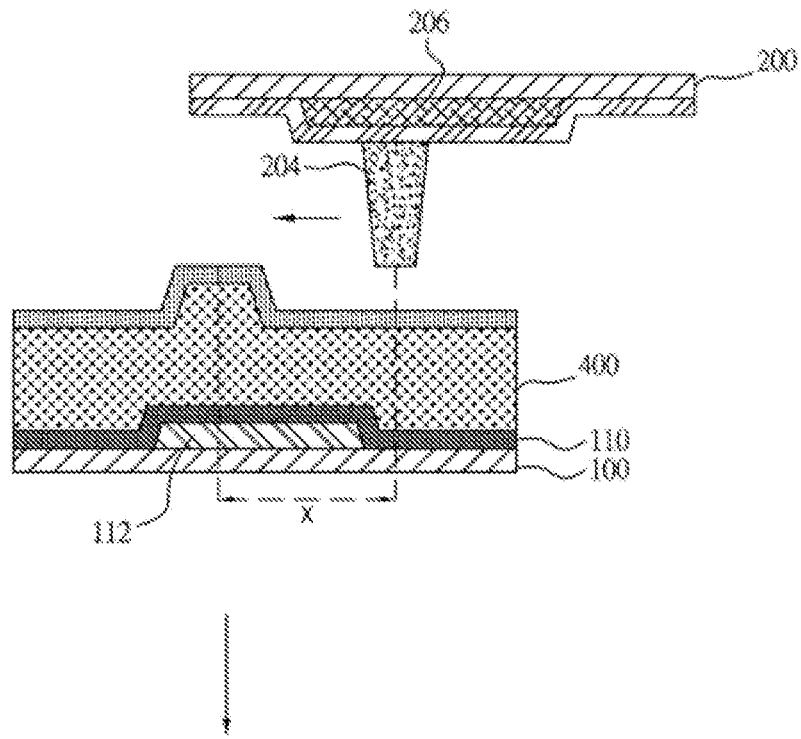
FIG. 2e is a schematic diagram of a status change in a right part of the curved display panel in FIG. 2b.
Figure 2E:
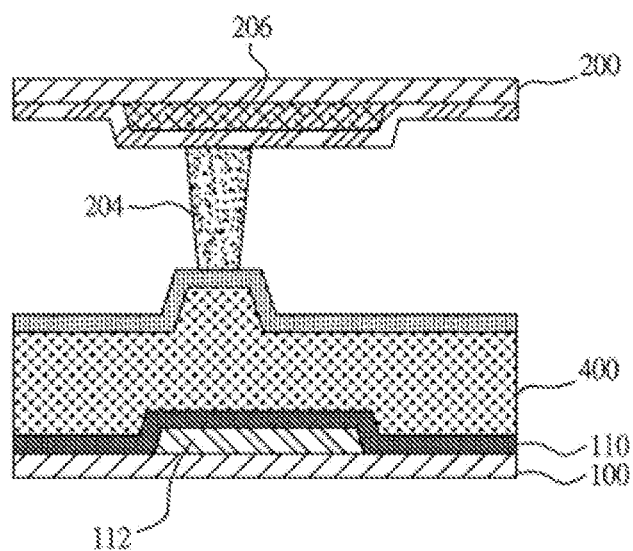

FIG. 2a is a schematic diagram of a deviation distance of a curved display panel according to an embodiment of this application. FIG. 2b is a schematic diagram of a bending change of a curved display panel according to an embodiment of this application. FIG. 2c is a schematic diagram of a status change in a middle part of the curved display panel in FIG. 2b. FIG. 2d is a schematic diagram of a status change in a left part of the curved display panel in FIG. 2b. FIG. 2e is a schematic diagram of a status change in a right part of the curved display panel in FIG. 2b. In an embodiment of this application, a curved display panel includes a first substrate 100 and a second substrate 200. The first substrate 100 includes a display area, and a frame area arranged surrounding and peripheral of the display area. An array arrangement 110 is disposed in the display area, and the array arrangement 110 includes a plurality of active switches 112 and a plurality of pixel cells. The plurality of pixel cells is respectively coupled to the plurality of active switches 112, and the plurality of active switches 112 is electrically coupled to junctions of a plurality of data lines and a plurality of scanning lines. The second substrate 200 is disposed opposite to the first substrate 100. A plurality of spacers 204 is disposed on the second substrate 200, and is configured to define a space between the first substrate 100 and the second substrate 200 when the first substrate 100 is assembled with the second substrate 200. In a planar state, starting from a center vertical line C of the display area, an arrangement sequence of a current column of spacers 2041 in the plurality of spacers 204 is the same as that of a current column of active switches 1121 in the plurality of active switches 112 in an arrangement direction of the plurality of data lines. When a position of the current of spacers 2041 overlaps a position of the current column of active switches 1121, a first spacing L1 between neighboring columns of spacers (that is, the current column of spacers 2041 and a next column of spacers 2042) differs from a second spacing L2 between neighboring columns of switches (that is, the current column of active switches 1121 and a next column of active switches 1122) by an deviation distance X. In a curved state, a position of the plurality of spacers 204 overlaps that of the plurality of active switches 112.

In an embodiment, the curved display panel further includes a color filter layer 400, and the color filter layer 400 may be disposed on the first substrate 100 or the second substrate 200.

In an embodiment, the first substrate 100 is an array substrate, and the second substrate 200 is an opposite substrate.

In an embodiment, the curved display panel is bent towards a side of the second substrate 200, and when in the planar state, the first spacing L1 is a sum value of the second spacing L1 and the deviation distance X, that is, L1=L2+X.

In an embodiment, when the curved display panel is predetermined to be bent towards the side of the second substrate 200, the plurality of spacers 204 deviates towards the direction of a center vertical line C of the display area by X.

In an embodiment, the deviation distances X corresponding to the plurality of spacers 204 in different positions are the same, different, or partially the same.

As shown in FIG. 2c, in an embodiment, a plurality of spacers 204 in the middle part and a plurality of active switches 112 whose position corresponds to that of the spacers 204 has a relatively small deviation distance X or has no deviation. After the panel is bent, the position of the plurality of spacers 204 still corresponds to that of the plurality of active switches 112 in the middle part of the two substrates.

As shown in FIG. 2d and FIG. 2e, in an embodiment, in the planar state, a plurality of spacers 204 on the fell side of the second substrate 200 deviates leftward (that is, away from the direction of the center vertical line C of the display area) by X. After the panel is bent, the left side of the second substrate 200 deviates rightward relative to the first substrate 100 by X, and the right side deviates leftward relative to the first substrate 100 by X. The position of the plurality of spacers 204 overlaps that of the plurality of active switches 112.

Figure 3A:
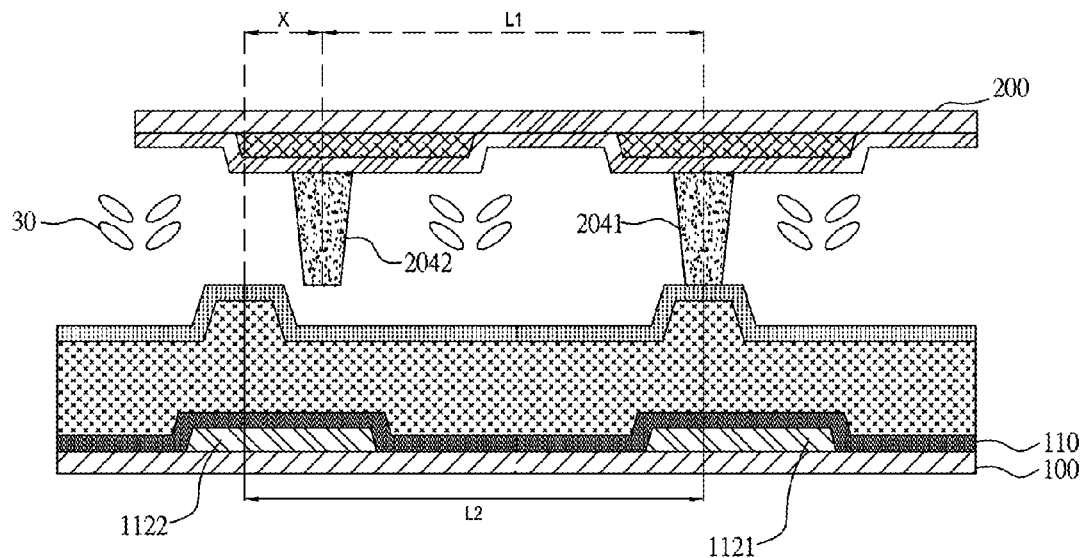
FIG. 3a is a schematic diagram of a deviation distance of a curved display panel according to an embodiment of this application.
Figure 3B:
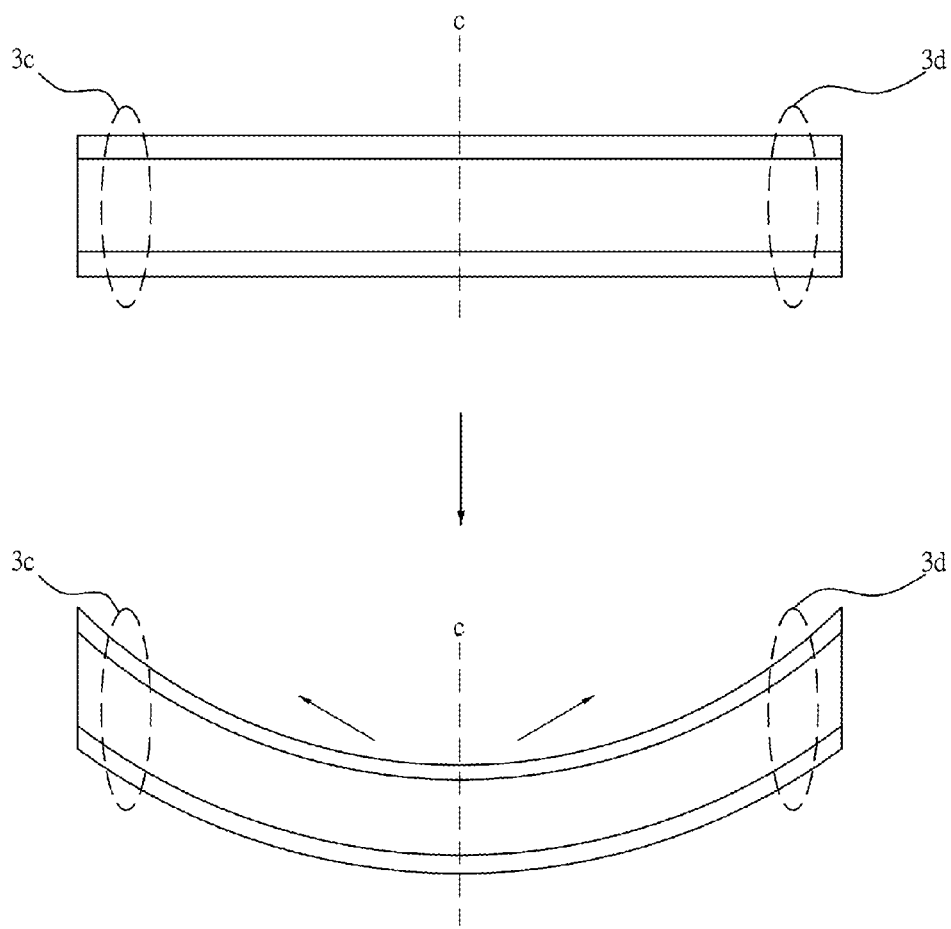
FIG. 3b is a schematic diagram of a bending change of a curved display panel according to an embodiment of this application.
Figure 3C:
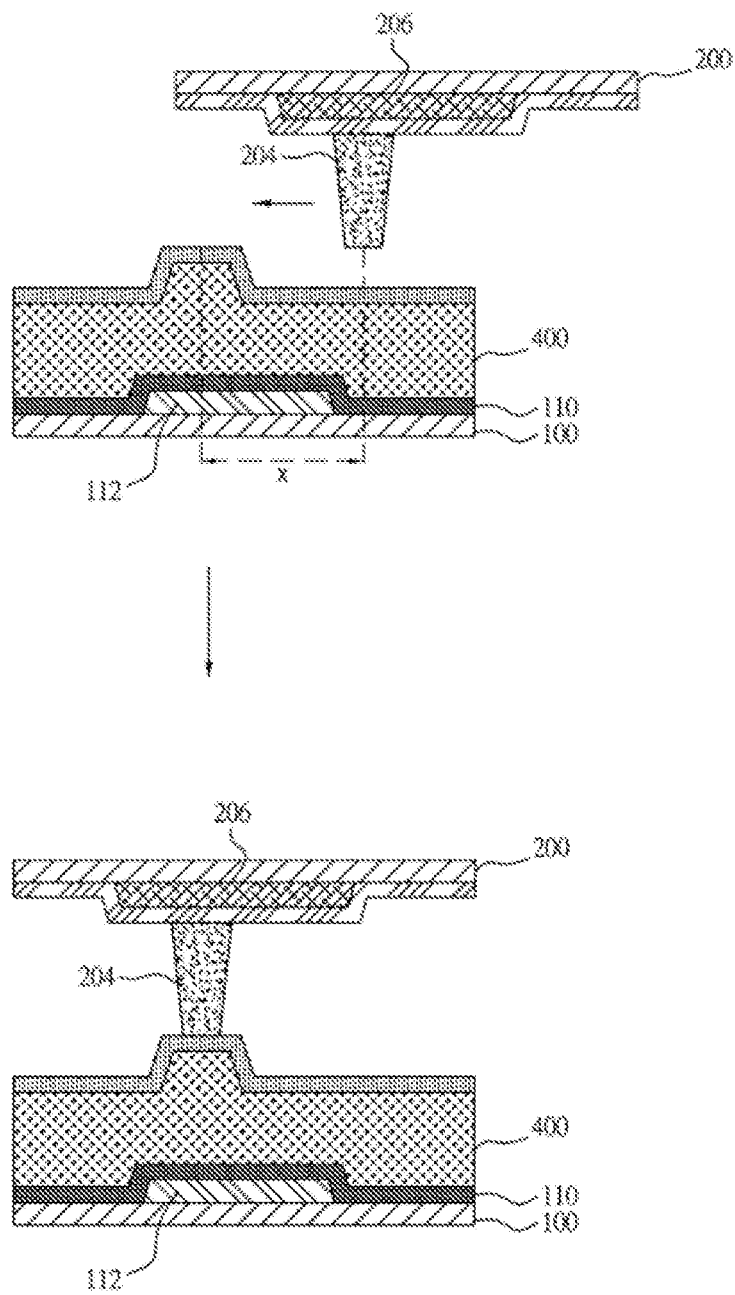
FIG. 3c is a schematic diagram of a status change in a left part of the curved display panel in FIG. 3b.
Figure 3D:
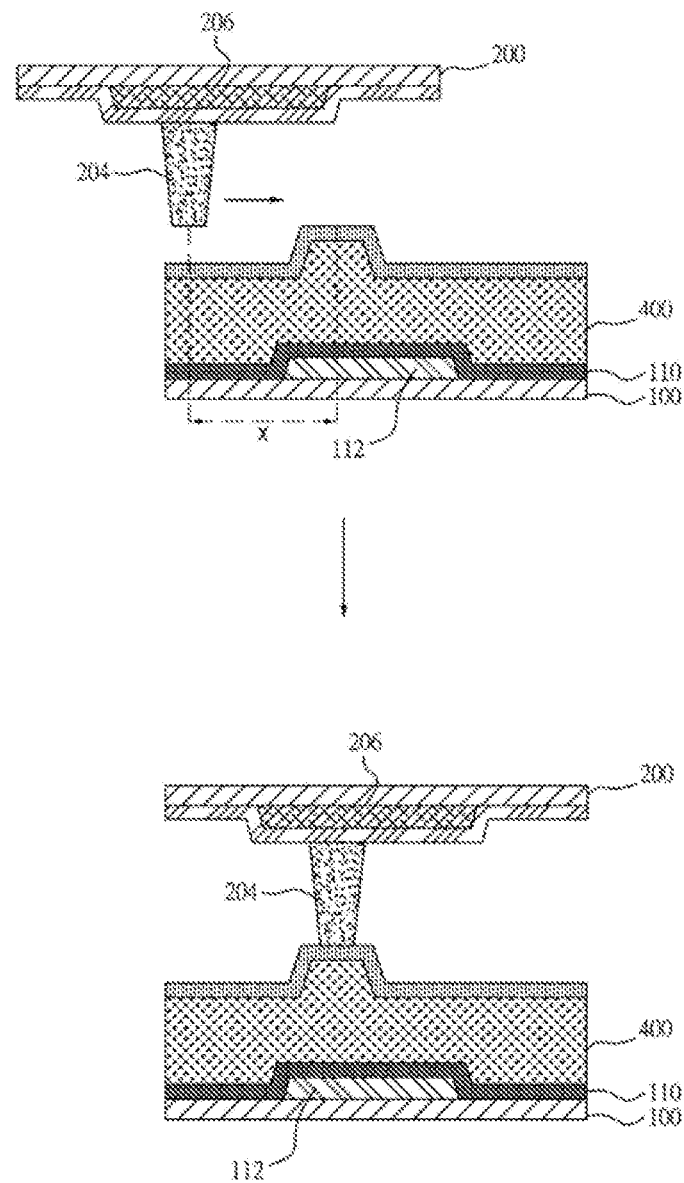
FIG. 3d is a schematic diagram of a status change in a right part of the curved display panel in FIG. 3b.

FIG. 3a is a schematic diagram of a deviation distance of a curved display panel according to an embodiment of this application. FIG. 3b is a schematic diagram of a bending change of a curved display panel according to an embodiment of this application. FIG. 3c is a schematic diagram of a status change in a left part of the curved display panel in FIG. 3b. FIG. 3d is a schematic diagram of a status change in a right part of the curved display panel in FIG. 3b.

In an embodiment, the curved display panel is bent towards the side of the first substrate 100. When in the planar state, the second spacing L2 is a sum value of the first spacing L1 and the deviation distance X, that is, L2=L1+X.

In an embodiment, when the curved display panel is predetermined to be bent towards the side of the first substrate 100, in the planar state, the plurality of spacers 204 deviates away from the direction of the center vertical line C of the display area by X. Alternatively, the plurality of active switches deviates towards the direction of the center vertical line C of the display area by X.

In an embodiment, a plurality of spacers 204 in the middle part and a plurality of active switches 112 whose position corresponds to that of the spacers 204 has a relatively small deviation distance X or has no deviation. Therefore, after the panel is bent, the position of the plurality of spacers 204 still corresponds to that of the plurality of active switches 112 in the middle part of the two substrates.

As shown in FIG. 3c and FIG. 3d, in an embodiment, in the planar state, each spacer 204 on the left side of the second substrate 200 deviates rightward (that is, towards the direction of the center vertical line C of the display area) by X, and each spacer 204 on the right side of the second substrate 200 deviates leftward (that is, towards the direction of the center vertical line C of the display area) by X. After the panel is bent, the left side of the second substrate 200 deviates leftward relative to the first substrate 100 by X, and the right side deviates rightward relative to the first substrate 100 by X. The position of the plurality of spacers 204 overlaps that of the plurality of active switches 112.

In an embodiment, the spacer 204 deviates by X in advance based on at least one of a distance between the spacer 204 and the center vertical line of the display area, the active switch 112 corresponding to the spacer 204, a column number to which the spacer 204 belongs, the corresponding active switch 112, a bending direction of the curved display panel, a preset bending radius of the second substrate 200, and a predetermined bending coefficient of the position of the spacer 204.

In an embodiment, the plurality of data lines is arranged at equal intervals.

In an embodiment, in the planar state, the first spacing L1 and the second spacing L2 are in an equal proportion relationship.

In an embodiment, the curved display panel is bent towards the side of the second substrate 200, and the equal proportion relationship is L1:L2=(R+d):R, where L1 is the first spacing, L2 is the second spacing, R is the preset bending radius of the second substrate 200, and d is a thickness of the space.

In an embodiment, the curved display panel is bent towards the side of the first substrate 100, and the equal proportion relationship is L1:L2=(R+d):R, where L1 is the first spacing, L2 is the second spacing, R is the preset bending radius of the second substrate 200, and d is a thickness of the space.

In an embodiment, the second substrate 200 further includes a light shielding layer 206, and the light shielding layer 206 is disposed over the plurality of spacers 204.

In an embodiment, the light shielding layer 206 includes a black matrix.

In an embodiment, in the curved state, an opening area of the curved liquid crystal panel is perpendicularly opposite to a light shielding area, and the first substrate 100 matches pixel areas of the second substrate 200.

In an embodiment, the light shielding area includes cabling positions between the light shielding layer 206 of the second substrate 200 and the plurality of data lines of the first substrate 100.

In an embodiment, the preset bending radius R of the second substrate 200 is a distance between a center of the second substrate 200 in the curved state and a side surface of the space adjacent to the center.

In an embodiment, the curved display panel further includes a liquid crystal layer 30, located between the first substrate 100 and the second substrate 200.

In an embodiment, a plurality of display sections is obtained through division from the inside to the outside by starting from the center vertical line C of the display area, and the deviation distances X corresponding to the display sections are the same, different, or partially the same.

In an embodiment, in two neighboring display sections, the deviation distance corresponding to inner display sections is less than or equal to the deviation distance X corresponding to outer display sections.

In an embodiment, a plurality of display sections is obtained through division from the inside to the outside by starting from the center vertical line C of the display area, and in the planar state, the equal proportion relationships between the first spacings L1 and the second spacings L2 that correspond to the plurality of display sections are the same, different, or partially the same.

In an embodiment, the deviation distance X may be respectively designed based on actual positions of the spacer 204 and the active switch 112. In this way, a design personnel can flexibly adjust bending degrees in different parts of the curved display panel, and the design is more flexible.

In an embodiment, when the curved display panel is bent towards the side of the second substrate 200, in two neighboring display sections, the equal proportion relationship corresponding to inner display sections is less than or equal to the equal proportion relationship corresponding to outer display sections.

In an embodiment, when the curved display panel is bent towards the side of the first substrate 100, in two neighboring display sections, the equal proportion relationship corresponding to inner display sections is greater than or equal to the equal proportion relationship corresponding to outer display sections.

In an embodiment of this application, a curved display device is provided, including a controller (not shown in the figure) and the foregoing curved display panel.

In this application, the deviation of the spacers is designed in advance on the premise of not greatly changing an existing production procedure, to avoid misalignment between the spacers and the active switches in the curved state, enable the space between the two substrates to maintain an equal thickness, reduce luminance difference between the areas on the left and the right sides and the area in the middle of the curved display panel, and reduce visual darkness, thereby improving display quality and optical taste of the curved display panel.

The above descriptions are merely optional embodiments of this application, and are not intended to limit this application. It should be understood by persons skilled in the art that various modifications and variations can be made to this application. Any modification, equivalent replacement, or improvement made without departing from the spirit and principle of this application shall fall within the scope as defined by the appended claims.

What is claimed is:

1. A curved display panel, comprising:
a first substrate, comprising a display area, a frame area arranged surrounding and peripheral of the display area, and an array arrangement disposed on the display area, wherein the array arrangement comprises a plurality of active switches and a plurality of pixel cells, the plurality of pixel cells is respectively coupled to the plurality of active switches, and the plurality of active switches is electrically coupled to junctions of a plurality of data lines and a plurality of scanning lines;
a second substrate, disposed opposite to the first substrate; and
a plurality of spacers, disposed between the first substrate and the second substrate and configured to define a space between the first substrate and the second substrate;
wherein in a planar state, an arrangement sequence of a current column of spacers in the plurality of spacers is the same as that of a current column of active switches in the plurality of active switches in an arrangement direction of the plurality of data lines in the display area, and in the planar state, a position of the current column of spacers overlaps that of the current column of active switches and a first spacing between neighboring columns of spacers differs from a second spacing between neighboring columns of active switches by a deviation distance; and in a curved state, a position of the plurality of spacers overlaps that of the plurality of active switches, wherein the curved display panel is bent towards a side of the second substrate, the first spacing and the second spacing are in an equal proportion relationship, and the equal proportion relationship is $L1:L2=(R+d):R$, wherein L1 is the first spacing, L2 is the second spacing, R is a preset bending radius of the second substrate, and d is a thickness of the space, wherein in the case that the curved display panel is bent towards the side of the second substrate, in two neighboring display sections, the equal proportion relationship corresponding to inner display sections is less than the equal proportion relationship corresponding to outer display sections.

2. The curved display panel according to claim 1, wherein the curved display panel is predetermined to be bent towards the side of the second substrate, and in the planar state, the plurality of spacers deviates away from a center vertical line of the display area.

3. The curved display panel according to claim 1, wherein the curved display panel is bent towards the side of the second substrate, and in the planar state, the first spacing is a sum value of the second spacing and the deviation distance.

4. The curved display panel according to claim 1, wherein the curved display panel further comprises a color filter layer disposed on one of the first substrate and the second substrate.

5. The curved display panel according to claim 1, wherein the preset bending radius R of the second substrate is a distance between a center of the second substrate in the curved state and a side surface of the space adjacent to the center.

6. The curved display panel according to claim 1, wherein the second substrate further comprises a light shielding layer, and the light shielding layer is disposed over the plurality of spacers.

7. The curved display panel according to claim 6, wherein the light shielding layer comprises a black matrix.

8. The curved display panel according to claim 7, wherein the light shielding area comprises cabling positions between a light shielding layer of the second substrate and the plurality of data lines of the first substrate.

9. The curved display panel according to claim 6, wherein in the curved state, an opening area of the curved liquid crystal panel is perpendicularly opposite to a light shielding area.

10. The curved display panel according to claim 1, wherein in two neighboring display sections, the deviation distance corresponding to inner display sections is less than the deviation distance corresponding to outer display sections.

11. The curved display panel according to claim 1, wherein the curved display panel further comprises a liquid crystal layer, located between the first substrate and the second substrate.

12. The curved display panel according to claim 1, wherein the first substrate is an array substrate, and the second substrate is an opposite substrate.

13. A curved display device; comprising:
a controller;
a first substrate, comprising a display area, a frame area arranged surrounding and peripheral of the display area, and an array arrangement disposed in the display area; wherein the array arrangement comprises a plurality of active switches and a plurality of pixel cells, the plurality of pixel cells is respectively coupled to the plurality of active switches, and the plurality of active switches is electrically coupled to junctions of a plurality of data lines and a plurality of scanning lines;
a second substrate, disposed opposite to the first substrate; and
a plurality of spacers, disposed between the first substrate and the second substrate and configured to define a space between the first substrate and the second substrate;
wherein in a planar state, an arrangement sequence of a current column of spacers in the plurality of spacers is the same as that of a current column of active switches in the plurality of active switches in an arrangement direction of the plurality of data lines in the display area, and in the planar state, a position of the current column of spacers overlaps that of the current column of active switches and a first spacing between neighboring columns of spacers differs from a second spacing between neighboring columns of active switches by a deviation distance; and in a curved state, a position of the plurality of spacers overlaps that of the plurality of active switches, wherein the curved display panel is bent towards a side of the second substrate, the first spacing and the second spacing are in an equal proportion relationship, and the equal proportion relationship is L1:L2=(R+d):R, wherein L1 is the first spacing; L2 is the second spacing, R is a preset bending radius of the second substrate, and d is a thickness of the space, wherein in the case that the curved display panel is bent towards the side of the second substrate, in two neighboring display sections, the equal proportion relationship corresponding to inner display sections is less than the equal proportion relationship corresponding to outer display sections.

14. The curved display device according to claim 13, wherein in neo neighboring display sections, the deviation distance corresponding to inner display sections is less than the deviation distance corresponding to outer display sections.

* * * * *